United States Patent
Sato et al.

(10) Patent No.: US 8,404,791 B2
(45) Date of Patent: Mar. 26, 2013

(54) SILICONE RUBBER COMPOSITION

(75) Inventors: Takeshi Sato, Kanagawa (JP); Masaya Otsuka, Kumamoto (JP); Masashi Kudo, Kanagawa (JP)

(73) Assignee: NOK Kluber Co., Ltd., Tokyo (JP)

( * ) Notice: Subject to any disclaimer, the term of this patent is extended or adjusted under 35 U.S.C. 154(b) by 537 days.

(21) Appl. No.: 12/308,424

(22) PCT Filed: Jun. 15, 2007

(86) PCT No.: PCT/JP2007/062099
§ 371 (c)(1),
(2), (4) Date: Dec. 15, 2008

(87) PCT Pub. No.: WO2007/145313
PCT Pub. Date: Dec. 21, 2007

(65) Prior Publication Data
US 2010/0240828 A1    Sep. 23, 2010

(30) Foreign Application Priority Data

Jun. 16, 2006 (JP) .................................. 2006-167223

(51) Int. Cl.
*C08F 30/08* (2006.01)
(52) U.S. Cl. ....................................................... 526/279
(58) Field of Classification Search .................. 526/279
See application file for complete search history.

(56) References Cited

U.S. PATENT DOCUMENTS

| | | | | |
|---|---|---|---|---|
| 3,341,490 A | * | 9/1967 | Burdick et al. | 523/212 |
| 4,418,165 A | * | 11/1983 | Polmanteer et al. | 523/210 |
| 5,861,448 A | | 1/1999 | Griffith et al. | |

FOREIGN PATENT DOCUMENTS

| | | |
|---|---|---|
| JP | 05-017688 | 1/1993 |
| JP | 06-287304 | 10/1994 |
| JP | 2003-028302 | 1/2003 |
| JP | 2004-076870 | 3/2004 |

* cited by examiner

*Primary Examiner* — Kuo-Liang Peng
(74) *Attorney, Agent, or Firm* — Brinks Hofer Gilson & Lione

(57) ABSTRACT

A silicone rubber composition, which comprises 100 parts by weight of vinyl group-introduced methylphenylvinyl-based silicone rubber obtained by copolymerization of dimethylsiloxane copolymerization units as the main component with 3-30 mol. % of methylphenylsiloxane copolymerization units, and 0.2-8 parts by weight of an organic peroxide, where introduction of vinyl groups into the silicone rubber can be attained generally by copolymerization of 0.1-5 mol. % of methylvinylsiloxane. When silica is used as a filler, it is desirable to use a surfactant for silica, and water together. Owing to distinguished low-temperature characteristics and blister resistance, the present silicone rubber composition can be used a suitable seal material for a high-pressure hydrogen gas storage tank, for example, to storage under 70 MPa, and particularly as suitable vulcanization-molding materials for O rings, packings, gaskets, oil seals, valves, etc.

4 Claims, No Drawings

US 8,404,791 B2

SILICONE RUBBER COMPOSITION

RELATED APPLICATIONS

The present application is a 35 U.S.C. §371 national stage filing of International Patent Application No. PCT/JP2007/062099, filed Jun. 15, 2007, to which priority is claimed under 35 U.S.C. §120 and through which priority is claimed under 35 U.S.C. §119 to Japanese Priority Patent Application No. 2006-167223, filed Jun. 16, 2006.

TECHNICAL FIELD

The present invention relates to a silicone rubber composition, and more particularly to a silicone rubber composition for suitable use to vulcanization-molding materials, etc. of seal materials for high-pressure gas, particularly high-pressure hydrogen gas.

BACKGROUND ART

Due to recent energy problems such as possible exhaustion petroleum resources, etc., efficient fuel cells have been now brought into the limelight. The fuel cell is a system of generating electricity by reaction of hydrogen with oxygen, where how to store hydrogen is a problem. Up to now, how to store hydrogen under high-pressure, how to store hydrogen by adsorption onto a metal, how to reform hydrocarbon to recover hydrogen, etc. have been proposed. Storage of hydrogen gas under high-pressure must take a tank storage form.

Now, tanks capable of withstanding a hydrogen gas storage pressure of about 35 MPa are generally used, but cannot satisfy a sufficient mileage when the fuel cells are to be mounted on automobiles. Thus, storage under much higher-pressure, for example, about 70 MPa, has been now under study. Seals are indispensable for storage of hydrogen gas in a tank, and now metallic seals, EPDM rubber seals, etc. have been proposed, but in the present situation the metallic seals have a poor maintainability, whereas the EPDM rubber seals have a poor reliability.

Functions generally required for a high-pressure gas seal are an unbreakability due to pressure increases or pressure reduction (no occurrence of blisters) and a maintainability of rubbery elasticity even if exposed to extremely low temperatures by adiabatic expansion due to an abrupt pressure reduction. For example, it is known that CNG (compressed natural gas: about 20 MPa) known as a high-pressure fuel gas undergoes a temperature decrease down to about −60° C. by adiabatic expansion when subjected to abrupt pressure reduction. In view of this fact, it seems necessary that the rubbery elasticity must be maintained even at −60° C. or lower, because the hydrogen gas is stored under higher pressure than that of CNG. However, EPDM as now mainly used can maintain a satisfactory rubbery elasticity down to about −50° C., and thus has unsatisfactory low-temperature characteristics.

Seal materials in a tight seal structure capable of sustaining tight sealing of high-pressure gases such as high-pressure hydrogen gas, etc., so far used, include, for example, butyl rubber, fluororubber, hydrogenated nitrile rubber, tetrafluoroethylene-perfluoro(alkyl vinyl ether) copolymer, etc., as disclosed in the following Patent Literatures 1 and 2. However, these rubber materials for forming seal materials are not preferable, because of deterioration of sealability at low temperatures. Furthermore, at least butyl rubber, fluororubber, and hydrogenated nitrile rubber have a problem of blister occurrence, when subjected to abrupt pressure reduction.

Patent Literature 1: JP-A-2003-28302
Patent Literature 2: JP-A-2004-76870

Silicone rubber is also known as rubber having distinguished low-temperature characteristics, where polydimethylsiloxane having a small amount of vinyl groups as crosslinkable groups, most typical silicone rubber, has a low-temperature resistance down to about −55° C., and thus has no satisfactory low-temperature characteristics, whereas methylfluoroalkylvinyl-based silicone rubber has an effective low-temperature resistance down to about −70° C., but has a problem of blister occurrence when subjected to abrupt pressure reduction.

DISCLOSURE OF THE INVENTION

Problem to be Solved by the Invention

The object of the present invention is to provide a rubber composition for suitable use as vulcanization-molding materials for seal materials, etc. of high-pressure hydrogen gas storage tank, for example, to storage under 70 MPa, having distinguished low-temperature characteristics and blister resistance.

Means for Solving the Problem

The object of the present invention can be attained by a silicone rubber composition, which comprises 100 parts by weight of vinyl group-introduced methylphenylvinyl-based silicone rubber obtained by copolymerization of dimethylsiloxane copolymerization units as the main component with 3-30 mol. % of methylphenylsiloxane copolymerization units, and 0.2-8 parts by weight of an organic peroxide. Introduction of vinyl groups to the silicone rubber can be carried out generally by copolymerization of the silicone rubber with 0.1-5 mol. % of methylvinylsiloxane. When silica is used as a filler, it is preferable to use a surfactant for the silica, and water together.

Effect of the Invention

It is generally known in the case of dimethylsiloxane-methylphenylsiloxane copolymer that an increase in the phenyl group content of the copolymer up to a predetermined proportion can improve the cold resistance on the basis of relations between the phenyl group content of the copolymer and the brittle temperature, whereas in the case of the present silicone rubber composition restriction of copolymer proportion of methylphenylsiloxane copolymerization units in the silicone rubber containing dimethylsiloxane copolymerization units as the main component can give not only a resistance to low-temperature surroundings created by abrupt pressure reduction of high-pressure gases, but can also suppress occurrence of blisters by remaining gases within the seal members, and can particularly attain a remarkable effect an blister occurrence reduction.

In the case of blister occurrence by abrupt pressure reduction, it is important to release gases from the rubber as soon as possible at the time of pressure fluctuations. Those disclosed the afore-mentioned Patent Literatures as rubber materials having a distinguished gas tightness cannot avoid a phenomenon of easy blister occurrence by abrupt pressure reduction, whereas in the present invention highly gas-dispersible materials such as silicone-based rubber are used, though they are inferior to the other rubber materials as mentioned above strictly in gas seal tightness under the static pressure, but can maintain the sealability in the long run as a result, as compared with breakage of seal members due to blister occurrence as observed in the case of other rubber materials.

When silica is also used as a filler, it is preferable to use a surfactant for the silica, and water together. Simultaneous use of water is effective for further prevention of blister occurrence.

Owing to distinguished low-temperature characteristics and blister resistance, the present silicone rubber composition can be used as a suitable seal material for high-pressure hydrogen gas storage tanks, for example, to storage under 70 MPa, and specifically as suitable vulcanization-molding materials for O rings, packings, gaskets, oil seals, valves, etc. The high-pressure gas to be stored includes not only a hydrogen gas, but also, e.g. an oxygen gas, a nitrogen gas, a helium gas, etc. The present invention is directed to application to a high-pressure gas under 1 MPa or higher as a measure of the pressure resistance, and a distinguished pressure-resistant sealability can be attained particularly under 35 MPa or higher, as set forth in the storage tank specification, for example, under the service conditions of 70 MPa, as mentioned above.

BEST MODES FOR CARRYING OUT THE INVENTION

The methylphenylvinyl-based silicone rubber for use in the present invention is a silicone rubber, which comprises dimethylsiloxane copolymerization units as the main component, a methylphenylsiloxane copolymerization units (3-30 mol. %, preferably 10-25 mol. %, based on 100 mol. % of total), copolymerized with the former copolymerization units, and further a small amount (about 0.1 to about 5 mol. %, preferably about 0.5 to about 3 mol. %, and about 1 mol. % in Examples and Comparative Examples, based on 100 mol. % of total) of a vinyl group as a cross-linkable group, derived from methylvinylsiloxane $(CH_2=CH)(CH_3)SiO$ copolymerization units, etc. So long as the copolymerization proportion of the methylphenylsiloxane copolymerization units is within 3-30 mol. %, the methylphenylvinyl-based silicone rubber can have a glass transition temperature Tg of −80° to −90° C., and can be used at extremely low temperatures without any blister occurrence even if subjected to abrupt pressure reduction, whereas when the copolymerization proportion of the methylphenylsiloxane copolymerization units is outside the above-defined range, any satisfactory low-temperature characteristics cannot be obtained. Practically, commercially available products, KE138 Y-U, a product of Shin-Etsu Silicone Co., Ltd., DY32-379U, a product of Dow Corning Co., Ltd., etc. can be used as such.

The methylphenylvinyl-based silicone rubber can be vulcanized (cross-linked) by an organic peroxide. Any organic peroxide can be used without any particular restriction, so long as it can be generally used in rubber, and includes, for example, benzoyl peroxide, p-chlorobenzoyl peroxide, 2,4-dichlorobenzoyl peroxide, di-t-butyl peroxide, t-butyl cumyl peroxide, dicumyl peroxide, 1,1-di(t-butylperoxy)-3,3,5-trimethylcyclohexane, 2,5-dimethyl-2,5-di(t-butylperoxy)hexane, 2,5-dimethyl-2,5-di(t-butylperoxy)hexine-3,1,3-di(t-butylperoxyisopropyl)benzene, 2,5-dimethyl-2,5-di(benzoylperoxy)hexane, t-butylperoxy benzoate, t-butylperoxyisopropyl carbonate, n-butyl-4,4-di(t-butylperoxy)valerate, etc.

The organic peroxide can be used in a proportion of 0.2-8 parts by weight, preferably 1-5 parts by weight, on the basis of 100 parts by weight of silicone rubber. When the organic peroxide is used in a proportion of less than 0.2 parts by weight, any satisfactory cross-linking density cannot be obtained, whereas in a proportion of more than 8 parts by weight, foaming will take place, resulting in a failure to obtain vulcanization products or if obtained the rubbery elasticity or elongation will be lowered.

The silicone rubber composition can further contain, if required, besides the foregoing essential components, a reinforcing agent such as carbon black, silica, etc., a filler such as talc, clay, graphite, calcium silicate, etc., a processing aid such as stearic acid, palmitic acid, paraffin wax, etc., an acid acceptor such as zinc oxide, magnesium oxide, etc., an antioxidant, a plasticizer, etc., so far used generally as rubber compounding agents, appropriately.

Silica can be used as a reinforcing agent in a proportion of not more than 120 parts by weight, preferably about 50 to about 120 parts by weight, on the basis of 100 parts by weight of methylphenylvinyl-based silicone rubber. When silica is used, it is desirable to use together with not more than about 12 parts by weight, preferably about 2 to about 8 parts by weight, of a surfactant such as hexamethylsilazane, etc. on the basis of 100 parts by weight of silica, where the blisters will be hard to occur by using not more than about 50 wt. %, preferably about 10 to about 30 wt. % of water on the basis of the weight of the surfactant at the same time.

The present composition can be prepared by kneading through a kneader such as intermix, kneader, Banbury mixer, etc. or open rolls, etc., and vulcanization-molding can be carried out generally by heating at about 150° to about 200° C. for about 3 to about 60 minutes through an injection molding machine, a compression molding machine, a vulcanization press, etc., and if required, oven heating (secondary vulcanization) can be carried out by heating at about 150° to about 250° C. for about 1 to about 24 hours.

EXAMPLES

The present invention will be described in detail below, referring to Examples.

Example 1

|  | Parts by weight |
| --- | --- |
| Methylphenylvinyl-based silicone rubber (copolymerization proportion of methylphenylsiloxane copolymerization units: 10 mol. %) | 100 |
| Silica | 70 |
| Hexamethyldisilazane (surfactant for silica compounding) | 5 |
| Distilled water | 1 |
| 2,5-dimethyl-2,5-di(t-butylperoxy) hexane | 2 |

The foregoing components were kneaded through a kneader and open rolls, and the resulting kneading product was press vulcanized at 170° C. for 20 minutes, and oven vulcanized (secondary vulcanization) at 200° C. for 4 hours to produce vulcanized sheets (150 mm×150 mm×2 mm) and G25 size O rings (inner diameter: 24.4 mm, wire diameter: 3.1 mm).

The resulting vulcanizates were subjected to determination of the following items:
 Normal state physical properties: according to JIS K6253 and K6251 corresponding to ASTM D2240 and D412
 Low-temperature characteristics: TR test according to JIS K6261 corresponding to ASTM D1329, and determination of glass transition temperature Blister test: Visual determination of blister occurrence or not by placing the test samples into a hydrogen gas atmosphere or helium gas atmosphere under 70 MPa at 25° C. for 5 hours, followed by pressure reduction down to the normal atmospheric pressure within 5 second

Example 2

In Example 1, the same amount of methylphenylvinyl-based silicone rubber having a copolymerization proportion of methylphenylsiloxane copolymerization units of 19 mol. % was used as the silicone rubber.

Comparative Example 1

In Example 1, the same amount of methylphenylvinyl-based silicone rubber having a copolymerization proportion of methylphenylsiloxane copolymerization units of 1.5 mol. % was used as the silicone rubber.

Comparative Example 2

In Example 1, the same amount of methylphenylvinyl-based silicone rubber having a copolymerization proportion of methylphenylsiloxane copolymerization units of 35 mol. % was used as the silicone rubber.

Comparative Example 3

In Example 1, the amount of the organic peroxide was changed to 0.1 part by weight, but the prepared composition was foamed in the composition stage (i.e. in an unvulcanized state), as a failure to mold.

Comparative Example 4

In Example 1, the amount of the organic peroxide was changed to 10 parts by weight, but the vulcanized sheets were foamed, as failure to mold.

Comparative Example 5

In Example 1, the same amount of methylvinyl-based silicone rubber (KE971-U, a product of Shin-Etsu Silicone Co., Ltd.) was used as the silicone rubber, and the amount of silica was changed to 95 parts by weight.

Comparative Example 6

In Example 1, the same amount of methylfluoroalkylvinyl-based silicone rubber (FE271-U, a product of Shin-Etsu Silicone Co., Ltd.) was used as the silicone rubber, and the amount of silica was changed to 40 parts by weight.

The results obtained in the foregoing Examples and Comparative Examples (excluding Comparative Examples 3 and 4) are shown in the following Table:

TABLE

| Measurement evaluation Items | Ex. 1 | Ex. 2 | Comp. Ex. 1 | Comp. Ex. 2 | Comp. Ex. 5 | Comp. Ex. 6 |
|---|---|---|---|---|---|---|
| Normal state physical properties | | | | | | |
| Hardness (Duro A) | 71 | 69 | 70 | 71 | 71 | 69 |
| Tensile strength (MPa) | 10.5 | 10.1 | 9.55 | 9.42 | 8.78 | 10.3 |
| Elongation at break (%) | 380 | 360 | 300 | 290 | 220 | 250 |
| Low-temperature characteristics | | | | | | |
| TR-10 (° C.) | −77 | −72 | −58 | −52 | −50 | −63 |
| Glass transition temp. | | | | | | |
| Tg (° C.) | −88 | −85 | −69 | −66 | −61 | −70 |
| Blister test | | | | | | |
| Blister occurrence | | | | | | |
| H$_2$ | none | none | none | none | none | yes |
| He | none | none | none | none | none | yes |

It can be observed from the foregoing results that Examples show good low-temperature characteristics and blister resistance, whereas Comparative Examples 1, 2 and 5 show poor low-temperature characteristics, and Comparative Example 6 shows a poor blister resistance.

The invention claimed is:

1. A high-pressure gas seal material which is vulcanization-molded from a silicone rubber composition which silicone rubber composition comprises 100 parts by weight of vinyl group-induced methylphenylvinyl-based silicone rubber obtained by copolymerization of dimethylsiloxane copolymerization units as the main component with 3-30 mol. % of methylphenylsiloxane copolymerization units, and 0.5-3 mol. % of methylvinylsiloxane copolymerization units, 0.2-8 parts by weight of an organic peroxide, 50-120 parts by weight of silica, and 2-8 parts by weight of hexamethyldisilazane on the basis of 100 parts by weight of silica.

2. A high-pressure gas seal material according to claim 1, wherein not more than 50 wt. % of water is further contained in the silicone rubber composition on the basis of the weight of the hexamethydisilazane.

3. A high-pressure gas seal material according to claim 2 for use as a high-pressure hydrogen gas seal material.

4. A high-pressure gas seal material according to claim 1 for use as a high-pressure hydrogen gas seal material.

* * * * *